United States Patent
Mitsuta et al.

(10) Patent No.: US 8,815,465 B2
(45) Date of Patent: Aug. 26, 2014

(54) MEMBRANE ELECTRODE ASSEMBLY FOR POLYMER ELECTROLYTE FUEL CELL AND POLYMER ELECTROLYTE FUEL CELL

(75) Inventors: Naoki Mitsuta, Saitama (JP); Shintaro Tanaka, Saitama (JP); Taku Eguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/576,003

(22) PCT Filed: Jan. 31, 2011

(86) PCT No.: PCT/JP2011/051899
§ 371 (c)(1),
(2), (4) Date: Jul. 30, 2012

(87) PCT Pub. No.: WO2011/096355
PCT Pub. Date: Aug. 11, 2011

(65) Prior Publication Data
US 2012/0301809 A1 Nov. 29, 2012

(30) Foreign Application Priority Data
Feb. 2, 2010 (JP) .................... 2010-021529

(51) Int. Cl.
*H01M 8/10* (2006.01)
*H01M 4/86* (2006.01)
*H01M 8/02* (2006.01)

(52) U.S. Cl.
CPC ............. *H01M 8/1004* (2013.01); *Y02T 90/32* (2013.01); *H01M 8/0258* (2013.01); *H01M 4/8657* (2013.01); *H01M 2008/1095* (2013.01); *Y02E 60/521* (2013.01); *H01M 2250/20* (2013.01); *H01M 8/1025* (2013.01); *H01M 8/0254* (2013.01); *H01M 8/1067* (2013.01); *H01M 8/1039* (2013.01)
USPC .......................................... 429/481; 429/532

(58) Field of Classification Search
None
See application file for complete search history.

(56) References Cited

U.S. PATENT DOCUMENTS

| 6,946,211 | B1 * | 9/2005 | Bjerrum et al. | 429/480 |
| 8,557,466 | B2 * | 10/2013 | Nakagawa et al. | 429/457 |
| 2002/0071980 | A1 * | 6/2002 | Tabata et al. | 429/30 |

(Continued)

FOREIGN PATENT DOCUMENTS

| JP | 1999-265721 A | 9/1999 |
| JP | 2004-111191 A | 4/2004 |

(Continued)

OTHER PUBLICATIONS

JP, 2004-111191, A (a raw machine translation).*

(Continued)

*Primary Examiner* — Milton I Cano
*Assistant Examiner* — Carmen Lyles-Irving
(74) *Attorney, Agent, or Firm* — Carrier Blackman & Associates, P.C.; Joseph P. Carrier; William D. Blackman

(57) ABSTRACT

A membrane electrode assembly for a polymer electrolyte fuel cell includes: a proton conductive membrane for conducting protons; electrode catalyst layers arranged at both sides of the proton conductive membrane containing catalyst particles and an electrode electrolyte; and gas diffusion layers arranged on the respective electrode catalyst layers, having a porous basic material. Further, intermediate layers each having a thickness of 2-6 μm are included, with noble metallic nanoparticles, an electrode electrolyte and carbon powder.

11 Claims, 6 Drawing Sheets

(56) References Cited

U.S. PATENT DOCUMENTS

| | | |
|---|---|---|
| 2004/0265679 A1 | 12/2004 | Yamamoto |
| 2005/0095465 A1 | 5/2005 | Tanaka et al. |
| 2005/0181270 A1 | 8/2005 | Sugiura |
| 2006/0286437 A1* | 12/2006 | Aihara et al. .......... 429/44 |
| 2009/0162721 A1* | 6/2009 | Naohara et al. ........ 429/30 |
| 2010/0003567 A1 | 1/2010 | Kadotani |

FOREIGN PATENT DOCUMENTS

| | | |
|---|---|---|
| JP | 2005-228601 A | 8/2005 |
| JP | 2006-107752 A | 4/2006 |
| JP | 2007-062302 A | 3/2007 |
| JP | 2007-123146 A | 5/2007 |
| JP | 2007-287414 A | 11/2007 |
| JP | 2008-034157 A | 2/2008 |
| JP | 2008-192330 A | 8/2008 |
| JP | 2009-064604 A | 3/2009 |
| JP | 2009-199915 A | 9/2009 |
| JP | 2009-245774 A | 10/2009 |
| JP | 4492037 B2 | 6/2010 |
| WO | 03/056649 A1 | 7/2003 |

OTHER PUBLICATIONS

JP, 2009-245774, A (a raw machine translation).*

* cited by examiner

ELECTRON CONDUCTIVE PATH

PRIOR ART

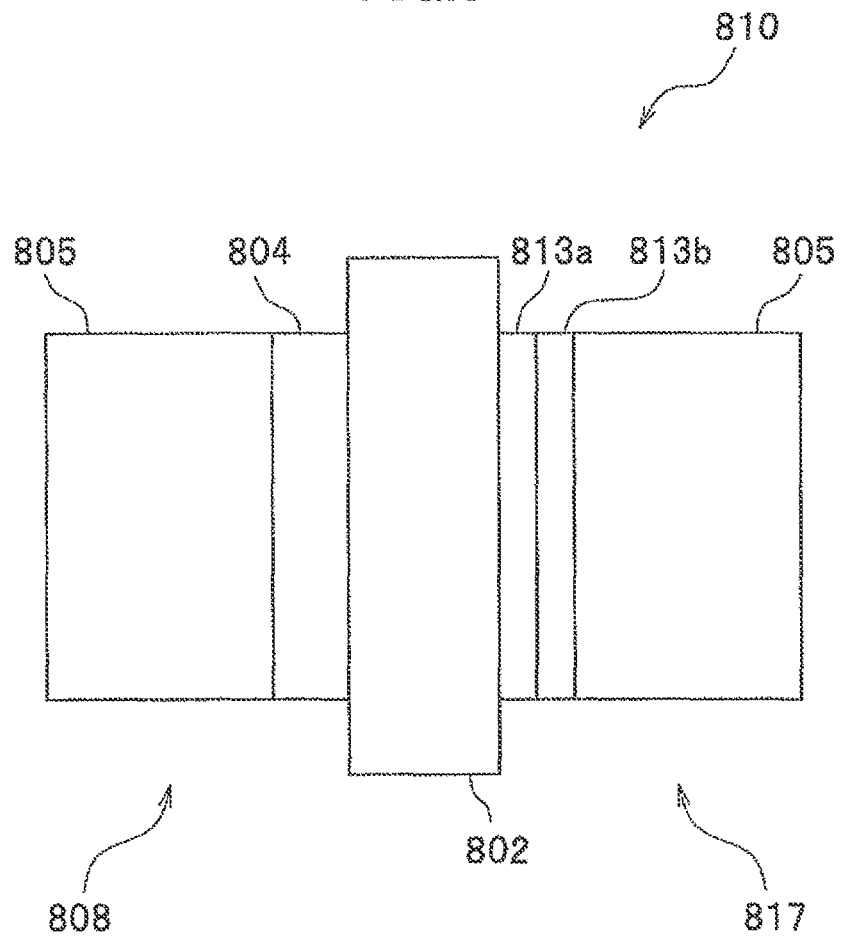
PRIOR ART

MEMBRANE ELECTRODE ASSEMBLY FOR POLYMER ELECTROLYTE FUEL CELL AND POLYMER ELECTROLYTE FUEL CELL

FIELD OF THE INVENTION

The present invention relates to a membrane electrode assembly for a polymer electrolyte fuel cell and a polymer electrolyte fuel cell using the membrane electrode assembly.

BACKGROUND OF THE INVENTION

A fuel cell has been widely used as a clean power generation system for little exerting negative influence on the environment. That is because a fuel cell generates electric power using hydrogen and oxygen as reaction gases to produce only water as a product in the electrode reaction. Currently, main application of a fuel cell spreads to various devices such as a fuel cell vehicle, a fuel cell for home use, and a mobile device.

Among many types of fuel cells, a polymer electrolyte fuel cell (PEFC) works at the operational temperature from room temperature to a degree of 90° C., and may rapidly generate electric power, allowing the PEFC to be widely used for a fuel cell vehicle.

Internal surroundings of the polymer electrolyte fuel cell used for the fuel cell vehicle, especially, units in a vicinity of electrodes (hereinafter, those may be collectively called a proton conductive membrane, an electrode catalyst layer and a gas diffusion layer (see FIG. 3)) are influenced by the frequent operations of starting and stopping of the fuel cell vehicle. Further, the units turn into an excessively dry state (or a highly dry state) or an excessively humid state (or a highly humid state) resulting from various changes in a driving environment and situation. This may cause changes in the power generation surroundings.

The vicinity of electrodes, for example, becomes a highly dry state when a polymer electrolyte fuel cell has just started, or a humidifier does not catch up with electric power generation or the like. Then, after the polymer electrolyte fuel cell has been operated for awhile after the starting, the electrochemical reaction proceeds to produce water in an electrode catalyst layer, leading to a highly humid state.

Note if the polymer electrolyte fuel cell continues power generation in the highly dry state, ionic conductivity of the proton conductive membrane (or electrolytic membrane) or the like decreases thereby to increase the ionic conductive resistance of the membrane, resulting in deterioration in the power generation performance. On the other hand, if the polymer electrolyte fuel cell is placed in a highly humid state, micropores in the gas diffusion layer and the electrode catalyst layer are choked thereby to inhibit a flow of the reaction gases, resulting in deterioration in the power generation performance.

Accordingly, the change in the humidity condition in the vicinity of the electrodes may largely influence the power generation performance of the polymer electrolyte fuel cell. For example, this may make the power generation performance unstable. Such a drawback causes a strong demand for reducing the influence resulting from the change in the humidity condition.

Here, Patent Documents 1 to 3 disclose techniques for reducing the influence resulted from the change in the humidity condition with respect to polymer electrolyte fuel cells.

As shown in FIG. 6, Patent Document 1 discloses a membrane electrode structure for a polymer electrolyte fuel cell 610 comprising: a cathode (or an air electrode) 620 having a catalyst layer 622, an intermediate layer 624 and a gas diffusion layer 626 in the order; an anode (or a fuel electrode) 630 having a catalyst layer 632, an intermediate layer 634 and an a gas diffusion layer 636 in the order; a polymer electrolyte membrane 640 corresponding to a proton conductive membrane 2 of the present invention (see FIG. 3) arranged between the catalyst layer 622 of the cathode 620 and the catalyst layer 632 of the anode 630. Further, at least either of the catalyst layers 622 and 632 of the cathode 620 and the anode 630 includes a catalyst containing platinum, and the intermediate layers 624 and 634 contain carbon fibers. Herein, at least either of the intermediate layers 624 and 634 needs to satisfy at least one of the following conditions: (a) the platinum rate contained in the intermediate layer is 3-20 at % to the 100 at % of platinum contained in both the catalyst layer and the intermediate layer, and (b) 90 at % or more of platinum contained in the intermediate layer exists in the region up to a half of the thickness of the intermediate layer from the interface between the catalyst layer and the intermediate layer. Moreover, Patent Document 1 describes that preferably platinum is a supported catalyst in which platinum or a platinum alloy is supported on a carbon carrier.

Furthermore, Patent Document 1 describes not only that the contained carbon fibers form conductive paths to improve the electron conductivity but also that the capillary action makes the produced water (or water vapor) rapidly move from the catalyst layers 622 and 632 to the intermediate layers 624 and 634.

Further Patent Document 2 discloses as shown in FIG. 7, a membrane electrode assembly 712 for a fuel cell comprising: a cathode catalyst layer 716, a cathode backing layer 717 and a cathode diffusion layer 718 stacked at the cathode side of an electrolyte membrane 715 corresponding to a proton conductive membrane 2 of the present invention (see FIG. 3 in this specification); an oxygen gas passage 724 arranged at the outside of a cathode diffusion layer 718; an anode catalyst layer 721, an anode backing layer 722 and an anode diffusion layer 723 stacked at the anode side of the electrolyte membrane 715; and a hydrogen gas passage 725 arranged outside an anode diffusion layer 723. Here, each above mentioned layer and the electrolyte membrane 715 are arranged in the direction of the gravity. Further, Patent Document 2 describes that a water adsorbent is added to the cathode backing layer 717 and specifically NAFION® (registered trademark) is used as a water absorbent, which also works as an adhesive agent.

Patent Document 3 discloses fuel cell electrodes for a fuel cell 810 as shown in FIG. 8 including a fuel electrode (or an anode) 808 having a catalyst layer 804 at a fuel electrode side and a diffusion layer 805, together with an air electrode (or a cathode) 817. Further, Patent Document 3 discloses the air electrode 817 comprising: an electrolyte layer 802 corresponding to the proton conductive membrane 2 of the present invention (see FIG. 3 in this specification), a first catalyst layer 813a, a second catalyst layer 813b, and a diffusion layer 805 in the order. Herein, the first catalyst layer 813a is larger resistant to gas movement than the second catalyst layer 813b. Accordingly, the first catalyst layer 813a prevents hydrogen which has passed through the electrolyte membrane 802 from further moving, thereby to facilitate the hydrogen to be oxidized. The first catalyst layer 813a includes a carbon supported Pt catalyst, and the second catalyst layer 813b includes a Pt-Black catalyst (not shown in FIG. 8) corresponding to noble metallic nanoparticles 51 (see FIG. 3 in this specification). The Pt-Black catalyst has properties of a high affinity with water and a small contact angle with water, allowing a large amount of water to physically adhere to a surface of the catalyst.

PRIOR ART DOCUMENTS

Patent Literatures

Patent Document 1: Japanese Unexamined Patent Application Publication No. 2009-199915 (see Claim 1, Paragraphs 0007, 0014, 0028, 0033, and FIGS. 1A and 1B)
Patent Document 2: Japanese Unexamined Patent Application Publication No. 2006-107752 (see Claim 1, Paragraphs 0027, 0068, and FIGS. 2A and 2B)
Patent Document 3: Japanese Patent Publication No. 4492037 (see Claim 1, Paragraphs 0018, 0019, and FIGS. 5A, 5B and 6)

DISCLOSURE OF THE INVENTION

Problems to be Solved by the Invention

However, according to the technique disclosed in Patent Document 1, the contained carbon fibers enable water produced by power generation to be rapidly moved, thereby to reduce the humidity in the vicinity of the electrodes. However, if the vicinity of the electrodes becomes a highly dry state, a drawback occurs because it is impossible to increase the humidity.

Herein, platinum contained in the catalyst layer and the intermediate layer of Patent Document 1 has a high affinity with water and a small contact angle with water. Thus, the properties of platinum cause that platinum may hold water, while the state that platinum is contained in the catalyst layer and the intermediate layer, more specifically, the shape and size thereof are not clear. That is, it is assumed that the contained state of platinum is not adjusted appropriately. Accordingly, this causes other drawbacks that if the vicinity of the electrodes becomes a highly humid state, it is impossible to certainly control the vicinity for becoming an appropriately humid condition by absorbing water from the proton conductive membrane (or an electrolyte membrane). Further, it is also impossible to certainly control the vicinity of the electrodes for becoming an appropriately humid condition by supplying water to the proton conductive membrane, if the vicinity of the electrodes becomes a highly dry state.

Further, according to the technique disclosed in Patent Document 2, similarly to Patent Document 1, the addition of the absorbent to the cathode backing layer 717 enables water produced by the power generation to be rapidly absorbed, thereby to reduce the humidity in the vicinity of the electrodes. However, there is a drawback that if the vicinity of the electrodes becomes a highly dry state, it is difficult to supply water once absorbed to the proton conductive membrane.

Accordingly, the techniques of Patent Document 1 and Patent Document 2 have not achieved the solution of the aforementioned drawbacks that the change in the power generation environment, that is, the change in the humidity condition in the vicinity of the electrodes makes the power generation performance become unstable.

Moreover, according to the technique disclosed in Patent Document 3, the Pt-Black catalyst having the properties described hereinbefore is contained in the second catalyst layer corresponding to the intermediate layer of the present invention. Hereby, it is conceivable that the change in the surroundings humidity has little influence on the catalyst layer. In this connection, Patent Document 3 describes that a production amount of hydrogen fluoride (or HF), which is an index of radical generation, is reduced. However, insufficient optimization on a construction of the intermediate layer and a thickness of the layer may be liable to reduce the initial performance of the layer and also to reduce the performance thereof as using the intermediate layer.

The present invention has been investigated to solve the above mentioned drawbacks. Therefore, an object of the present invention is to provide a membrane electrode assembly for a polymer electrolyte fuel cell and a polymer electrolyte fuel cell using the membrane electrode assembly. With such assembly according to the present invention it is difficult for the power generation performance thereof to become unstable, Moreover, even though the change in the power generation surroundings, or the change in the humidity condition in the vicinity of the electrodes occurs, the initial performance thereof may be high, and the performance thereof is prevented from being reduced, even though the assemblies are used over a long-term period.

Means for Solving the Problems

The present inventors have diligently investigated to solve the aforementioned drawbacks. Accordingly, it has been found ideal that in the power generation surroundings of the polymer electrolyte fuel cell, when the vicinity of the electrodes becomes a highly dry state, preferably water is supplied to the proton conductive membrane, while water is removed from the proton conductive membrane when the vicinity of the electrodes becomes a highly humid state. This finding has led to the arrangement of an intermediate layer for buffering the change in water content between the electrode catalyst layer and the gas diffusion layer to realize the above mentioned preferable conditions. Further, the functions required for the arranged intermediate layer need to include: firstly, a large water retention capacity for supplying or removing water; secondly, a small change in the volume by the power generation surroundings; thirdly, rapid water supply or removal activity to/from the electrode catalyst layer in order to correspond to a momentary change in the operational situation; and fourthly, no inhibition of the gas movement to the electrode catalyst layer while water is absorbed. The above important findings have enabled the present invention to be realized.

A membrane electrode assembly for a polymer electrolyte fuel cell of the present invention that has solved the above mentioned drawbacks comprises: a proton conductive membrane for conducting protons; at least one electrode catalyst layer arranged at both sides of the proton conductive membrane, having catalyst particles and an electrode electrolyte; and a gas diffusion layer arranged on the electrode catalyst layer and having a porous basic material. Herein, an intermediate layer is arranged with a thickness of 2 to 6 μm, comprising noble metallic nanoparticles, an electrode electrolyte, and carbon powder, between at least one of the electrode catalyst layers and corresponding one of the gas diffusion layers.

The noble metallic nanoparticles (for example, platinum black) included in the intermediate layer are nanoparticles with extremely small particle diameters, making the surface area thereof dramatically larger than the case that noble metallic non-nanoparticles are included in the same amount. Further, noble metallic nanoparticles 51 such as platinum black have higher affinity with water "W" than carbon black or the like and small contact angles with water "W", allowing a large quantity of water "W" to physically adhere on a surface of the particle (see FIG. 1A). As shown in FIG. 3, the noble metallic nanoparticles are not supported by/on any carrier. Moreover, the intermediate layer does not adsorb water "W" between molecules (see FIG. 1B) different from a water absorbent WA such as NAFION® (trade mark) and a conventionally used electrode electrolyte, causing no change in the volume of the intermediate layer by supplying and removing water, and enabling water to rapidly and in a large amount be supplied and removed to/from the electrode catalyst layer.

Accordingly, the membrane electrode assembly for a polymer electrolyte fuel cell of the present invention comprises the noble metallic nanoparticles in the intermediate layer 5 (not shown in FIG. 2A). Hereby, as shown in FIG. 2A, when the vicinity of the electrodes becomes a highly dry state, water "W" kept by the noble metallic nanoparticles may be supplied from the intermediate layer 5 to the electrode catalyst layer 3 and the proton conductive membrane 2, thereby to increase the proton conductivity of the proton conductive membrane 2.

Further, the membrane electrode assembly for a polymer electrolyte fuel cell of the present invention comprises the noble metallic nanoparticles in the intermediate layer 5 (not shown in FIG. 2B). Hereby, as shown in FIG. 2B, when the vicinity of the electrodes becomes a highly humid state, water "W" produced in the electrode catalyst layer 3 may be taken into the intermediate layer 5 so as to remove water from the electrode catalyst layer 3. Therefore, the above mentioned effect may suppress the decrease in the power generation performance (or decrease in cell voltage), and the deterioration of the electrode catalyst layer 3 caused by water produced by the power generation choking the micropores of the electrode catalyst layer 3.

Moreover, the carbon powder included in the intermediate layer allows the gas diffusion performance inside the intermediate layer and the gas permeability into the electrode catalyst layer to be well kept. Furthermore, a predetermined range of the thickness of the intermediate layer allows the sufficient amount of the noble metallic nanoparticles to be included therein. Accordingly, those advantages make it possible to sufficiently exert the effects of the noble metallic nanoparticles and to well keep the gas diffusion performance.

As a result, the membrane electrode assembly for a polymer electrolyte fuel cell of the present invention may stably generate electric power at a wide range of the temperature. Hereby, if the change in the surroundings of power generation happens, that is, if the change in the humidity condition in the vicinity of the electrodes happens, it is unlikely such change will cause the power generation performance to become instable. Further, the initial performance may be heightened and the deteriorating performance in the long-term use may be suppressed.

In the present invention, at least either of the electrode catalyst layer and the intermediate layer comprises a fibrous carbon material. This makes the fibrous carbon material contained in either of the electrode catalyst layer and the intermediate layer work as a support column, allowing the layers having the fibrous carbon material to have more micropoures. Accordingly, water produced by power generation and the reaction gases in the layers having fibrous carbon easily comes out and into the electrode catalyst or intermediate layer, resulting in improvement of the power generation performance.

In the present invention, preferably the proton conductive membrane is a sulfonated polyarylene polymer.

The sulfonated polyarylene polymer largely varies the proton conductive performance by the water content, allowing the improvement of the power generation performance to be further fulfilled.

In the present invention, preferably an ion exchange capacity (IEC) of the proton conductive membrane is 1.9-2.4 meq/g.

Such a specific range of the ion exchange capacity (IEC) enables the water content of the proton conductive membrane to be sufficiently ensured, allowing the power generation performance to be secured at low humidity. Also, such a specific range of the IEC enables the flooding to be suppressed due to nonexcessive water content, allowing the power generation performance to be maintained at high humidity.

In the present invention, preferably the content of the noble metallic nanoparticles is 0.1-0.5 mg/cm$^2$ per unit projected area.

Such a specific range of the content of the noble metallic nanoparticles enables a sufficient amount of the nanoparticles having the aforementioned properties to be contained. Therefore, as mentioned before, when the vicinity of the electrodes becomes a highly dry state, water kept by the noble metallic nanoparticles may be supplied to the electrode catalyst layer 3 and the proton conductive membrane 4. This allows not only the proton conductivity of the proton conductive membrane 4 to be increased but also the performance deterioration in the long-term use to be suppressed.

In the present invention, preferably the content of the carbon powder is 15-45 mass % to the content of the noble metallic nanoparticles.

Such a specific range of the content of the carbon powder enables the micropores inside the intermediate layer to be sufficiently secured, thereby to increase the gas diffusibility inside the intermediate layer and the gas permeability into the electrode catalyst layer. This allows not only the initial performance to be high but also the performance deterioration in the long-term use to be suppressed.

In the present invention, preferably the content of the electrode electrolyte is 20-25 mass % to the content of the noble metallic nanoparticles.

Such a specific range of the content of the electrode electrolyte enables a sufficient amount of the electrode electrolyte to be contained, thereby to certainly conduct protons. Hereby, the initial performance may be heightened.

In the present invention, preferably the mean particle diameter of the noble metallic nanoparticles is 4-7 nm.

Such a specific range of the mean particle diameter of the noble metallic nanoparticles prevents the noble metallic nanoparticles from being eluted, even though the specific surface area of the noble metallic nanoparticles is large and when a high potential occurs. Hereby, the initial performance may be more heightened, and the performance deterioration in the long-term use may be suppressed.

The polymer electrolyte fuel cell of the present invention is a polymer electrolyte fuel cell using the aforementioned membrane electrode assembly for the polymer electrolyte fuel cell. In the polymer electrolyte fuel cell, are vertically arranged the membrane electrode assembly for the polymer electrolyte fuel cell together with the separator disposed between the adjacent membrane electrode assemblies for the polymer electrolyte fuel cell. Herein, the separator comprises a gas inlet formed at the upper part of the separator and a gas outlet formed at the lower part of the separator in order to let the reaction gases flow in the vertical direction.

The polymer electrolyte fuel cell of the present invention uses the membrane electrode assembly for the polymer electrolyte fuel cell comprising the intermediate layer with the noble metallic nanoparticles, the electrode electrolyte, and the carbon powder, and a thickness of the intermediate layer of 2-6 μm. This construction allows the electric power to be stably generated at a wide range of the humidity, and prevents the power generation performance from being unstable, even though the change in the surroundings of power generation, that is, the change in the humidity conditions in the vicinity of the electrodes happens. Further, the initial performance may be heightened, and the performance deterioration in the long-term use may be suppressed. Moreover, the membrane electrode assembly for the polymer electrolyte fuel cell and the separator are arranged in the vertical direction. The gas inlet is formed at the upper part of the separator and the gas outlet is formed at the lower part of the separator. This construction allows water produced in the electrode catalyst layer to flow downward by gravity, thereby to be discharged from the gas outlet. Hereby, this construction prevents the vicinity of the electrodes from being into an excessively highly humid state, and the micropores of the electrode catalyst layer and the intermediate layer from being choked by water. Accordingly, the polymer electrolyte fuel cell of the present invention may be stably generating electric power at the wide range of the humidity.

Advantages Effects of the Invention

The membrane electrode assembly for the polymer electrolyte fuel cell of the present invention comprises the intermediate layer including the noble metallic nanoparticles, the electrode electrolyte, and the carbon powder, with a thickness of the intermediate layer of 2-6 μm. This construction allows water produced in the electrode catalyst layer to be kept. Hereby, when the vicinity of the electrodes becomes a highly dry state, water may be supplied to the electrode catalyst layer, while when the vicinity of the electrodes becomes a highly humid state, water may be removed from the electrode catalyst layer.

Therefore, the membrane electrode assembly for the polymer electrolyte fuel cell of the present invention may stably generate electric power at the wide range of the humidity, and the power generation performance is hard to be unstable, even though the change in the surroundings of power generation, that is, the change in the humidity conditions in the vicinity of the electrodes happens. Further, the initial performance may be heightened, and the performance deterioration in the long-term use may be suppressed.

The polymer electrolyte fuel cell of the present invention comprises the membrane electrode assembly for the polymer electrolyte fuel cell together with the separator in the vertical direction. This construction makes it possible to stably generate electric power at the wide range of the humidity, and the power generation performance is hard to be unstable, even though the change in the surroundings of power generation, that is, the change in the humidity conditions in the vicinity of the electrodes happens. Further, the initial performance may be heightened, and the performance deterioration in the long-term use may be suppressed.

BRIEF DESCRIPTION OF THE DRAWINGS

FIG. 8 is a cross-sectional diagram explaining a further different example of a conventional membrane electrode assembly for a polymer electrolyte fuel cell.

MODES FOR CARRYING OUT THE INVENTION

Next, appropriately referring to the attached drawings, will be explained in detail a membrane electrode assembly for a polymer electrolyte fuel cell of the present invention, and a polymer electrolyte fuel cell using the membrane electrode assembly.

First, referring to FIG. 3, will be explained the membrane electrode assembly for the polymer electrolyte fuel cell of the present invention.

Figure 1A:
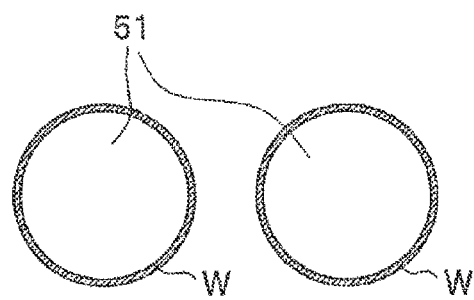
FIG. 1A is an explanatory diagram showing a state that water adheres to noble metallic nanoparticles (or platinum black).
Figure 1B:
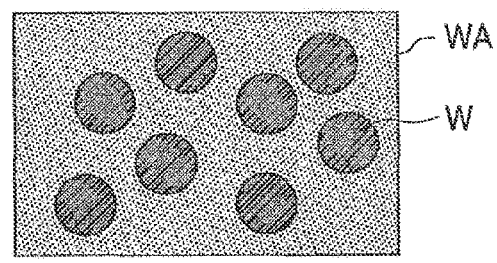
FIG. 1B is an explanatory diagram showing a state that a conventional absorbent adsorbs water between molecules.
Figure 2A:
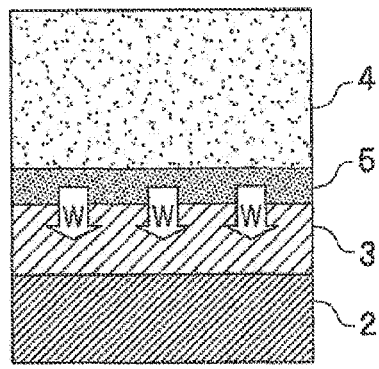
FIG. 2A is an explanatory diagram showing a function of the membrane electrode assembly for the polymer electrolyte fuel cell of the present invention in a dry state.
Figure 2B:
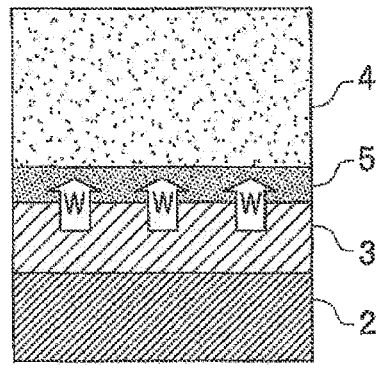
FIG. 2B is an explanatory diagram showing a function of the membrane electrode assembly for the polymer electrolyte fuel cell of the present invention in a humid state.
Figure 3:
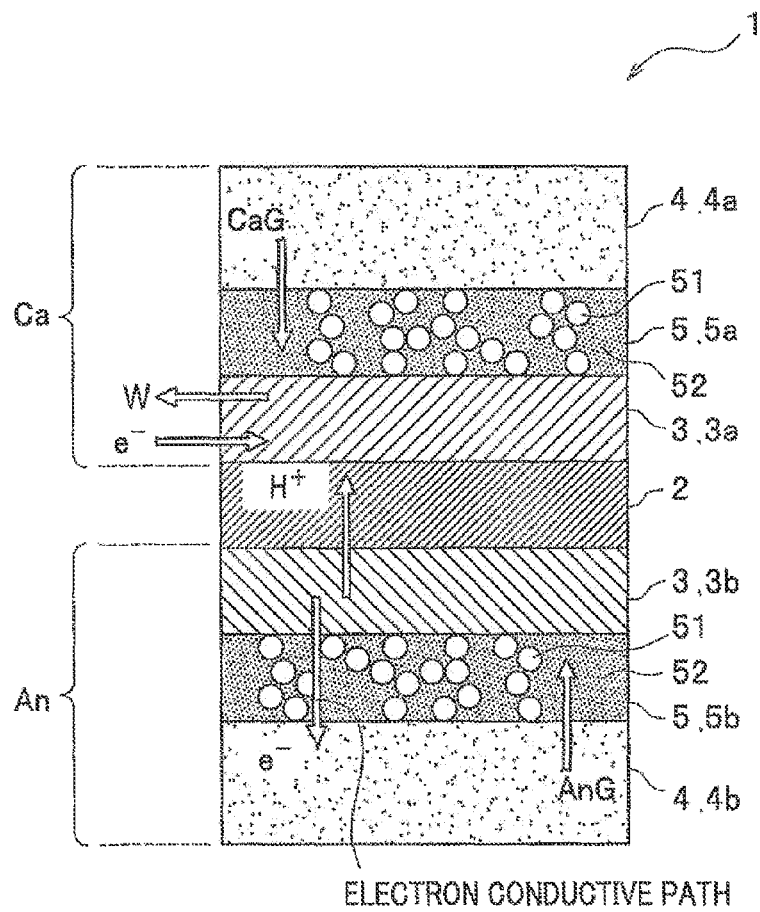
FIG. 3 is a cross-sectional schematic diagram explaining a construction of the membrane electrode assembly for the polymer electrolyte fuel cell of the present invention.

As shown in FIG. 3, the membrane electrode assembly 1 for the polymer electrolyte fuel cell 10 of the present invention comprises a proton conductive membrane 2, electrode catalyst layers 3 and gas diffusion layers 4, and intermediate layers 5. Herein, the intermediate layers 5 are arranged with thicknesses of 2-6 μm including noble metallic nanoparticles 51, an electrode electrolyte 52 and carbon powder (not shown in FIG. 3), and are disposed between at least one of the electrode catalyst layers 3 and corresponding one of the gas diffusion layers 4. Note FIG. 3 shows a state that the intermediate layers 5a, 5b are respectively disposed between the electrode catalyst layer 3a functioning as a cathode Ca and the gas diffusion layer 4a diffusing a cathode gas CaG such as an $O_2$ gas or the like, and between the electrode catalyst layer 3b functioning as an anode An and the gas diffusion layer 4b diffusing an anode gas AnG such as a $H_2$ gas or the like.

Hereinafter, each construction will be explained in detail.

The proton conductive membrane 2 is capable of conducting a proton $H^+$. A conventionally known polymer electrolyte membrane may be used as the proton conductive membrane 2. For example, a sulfonated polyarylene polymer and a fluorine containing ion exchanged resin shown in the next formula (1) may be used. Herein, the sulfonated polyarylene polymer shown in the formula (1) may be prepared by the method described in Japanese Unexamined Patent Application Publication No. 2005-158265 (see Paragraphs [0066] to

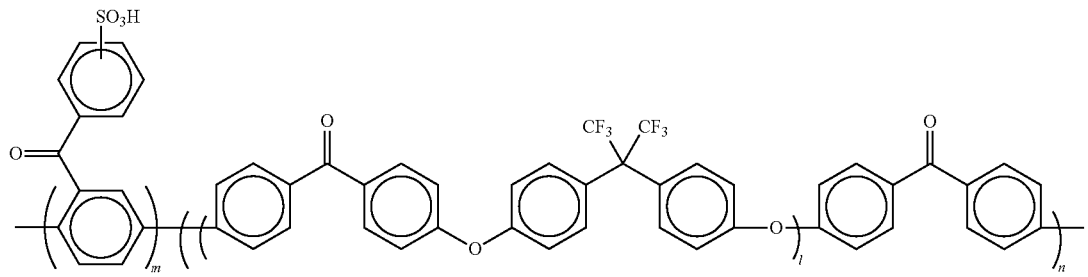

(1)

Note the above formula (1) represents that m:n=0.5-100: 95.5-0, preferably, m:n=0.5-99.999:95.5-0.001, and l=a positive integer.

An ion exchange capacity (IEC) of the proton conductive membrane 2 is preferably 1.9-2.4 meq/g. Such a specific range of the ion exchange capacity (IEC) of the proton conductive membrane enables a water content of the proton conductive membrane to be sufficiently secured. This allows the power generation performance at low humidity to be maintained, and prevents the flooding due to a non-excessive water content, thereby to maintain the power generation performance at high humidity.

The electrode catalyst layers 3 are arranged at both sides of the proton conductive membrane 2, and comprise catalyst particles and an electrode electrolyte.

The catalyst particles used in the electrode catalyst layer 3 are preferably made of a noble metal which is chemically stable and excellent in electrical conductivity, or carbon or an oxide supporting a noble metal. For example, Pt (platinum), Pd (palladium), or an alloy of Pt or Pd with other metals may be used. An application amount of the catalyst particles is, for example, 0.2-0.5 mg/cm$^2$, however, is not limited to the above mentioned amount.

A conventionally known ion conductive resin may be used as the electrode electrolyte used in the electrode catalyst layer 3. The ion conductive resin includes NAFION® (registered trademark) or the like which is a perfluorocarbon material prepared by a perfluorocarbon side chain having a carbon-fluorine skeleton and a sulfonic acid group.

Further, the electrode catalyst layer 3 may include the catalyst particles and the electrode electrolyte as well as a basic material which secures micropores and works as a support column. Such a basic material includes, for example, fibrous carbon such as vapor-growth carbon fibers.

Such an electrode catalyst layer 3 may be formed by the steps of: adding the above mentioned components into an optional solvent, for example, a solvent prepared by mixing NPA (normalpropylalcohol) and water in the ratio of 1:2 to 2:1 at the mass ratio; applying the homogeneous mixture prepared by stirring the mixture to a PET film or the like using a screen printing method; heating and drying the resultant product; letting the resultant product adhere to the proton conductive membrane 2 and conducting hot-pressing thereby to integrate the resultant product; and releasing off the PET sheet from the produced electrode catalyst layer.

Note the electrode catalyst layer 3a working as the cathode Ca and the electrode catalyst layer 3b working as the anode An may be prepared by using the same composition and the same method. Alternatively, the above mentioned layers 3a and 3b may be prepared in the different compositions and the different methods.

The gas diffusion layer 4 is arranged directly on the electrode catalyst layer 3 or as described hereinafter through the intermediate layer 5 disposed on the electrode catalyst layer 3. The gas diffusion layer 4 comprises a porous basic material.

The porous basic material includes, for example, carbon paper, carbon cloth, and carbon felt. Those porous basic materials may be used alone, processed in a water repellent treatment by attaching a fluorine resin thereto, or processed in a hydrophilic treatment by using titanium oxide, silicone, or a metal or the like.

The gas diffusion layer 4 may be formed by preparing a backing layer (not shown) including a water repelling fluorine resin and carbon with water repellency and electric conductivity by using alone or a mixture thereof. Alternatively, the gas diffusion layer 4 may be processed in a water repelling treatment on a surface of the gas diffusion layer 4 by a solution or a dispersion liquid containing a water repelling fluorine resin or carbon with water repellency and electric conductivity.

Formation of the backing layer and the water repelling treatment on the surface of the gas diffusion layer 4 facilitate water produced in the electrode catalyst layer 3 to easily move, allowing the micropores of the gas diffusion layer 4 to be prevented from being choked by water.

The water repelling fluorine resin may include, for example, polytetrafluoroethylene (PTFE). Further, carbon with water repellency and electric conductivity may include, for example, carbon black.

Such a gas diffusion layer 4 may be prepared as a gas diffusion layer having a backing layer, for example, in the steps of: mixing carbon with water repellency and electric conductivity and a water repelling fluorine resin at an optional mass ratio; homogeneously dispersing the resultant mixture in ethylene glycol or the like; applying the dispersion onto a porous basic material such as carbon paper; and drying the resultant product.

Further, in the present invention, as mentioned hereinbefore, the intermediate layer 5 with a thickness of 2-6 μm is arranged between the electrode catalyst layer 3 which is at least either of the electrode catalyst layer 3a working as a cathode Ca and the electrode catalyst layer 3b working as an anode An, and corresponding one of the gas diffusion layers 4. The intermediate layer 5 comprises the noble metallic particles 51, the electrode electrolyte 52 and the carbon powder (not shown in FIG. 3).

Herein, if the thickness of the intermediate layer 5 is less than 2 μm, a sufficient amount of the noble metallic nanoparticles 51 may not be included. Hereby, it is impossible to suppress the performance deterioration in the long-term use.

On the other hand, if the thickness of the intermediate layer 5 is more than 6 μm, the gas diffusion inside the intermediate layer 5 is prevented, resulting in deterioration in the initial performance.

Accordingly, the thickness of the intermediate layer 5 is determined as 2-6 μm.

Note the thickness of the intermediate layer 5 may be measured by the analysis of the cross-sectional image through using an electron microscope.

The noble metallic nanoparticles 51 include nanoparticles composed of an alloy such as Pt—Co, Pt—Fe, Pt—Zn, Pt—Cu, Pt—Ni, Pt—Ru, Pt—V, Pt—Pd, Pt—Ir, Pt—Lu, and Au—Pd, or an alloy containing two or more kinds of members selected from the above mentioned alloys. Alternatively, nanoparticles composed of a metallic element such as Pd, Au, Ru, Fe, Co or the like may be used. Here, platinum black (Pt) is used as the most preferable nanoparticles.

Platinum black is called Pt black, for example, TEC 90300 and TEC 90400 (TANAKA KIKINZOKU KOGYO), PtBlack HSA and PtBlack LSA (BASF SE), PtBlack powder (BL-1901: N.E. CHEMCAT Co.), and Hi-spec1000 (Johnson Matthey Plc) or the like may be used. Herein, as platinum black, may be used one member selected from the above mentioned catalyses, or two or more members may be selected and used together. Platinum black is excellent in oxidation resistance among noble metallic particles and power generation performance by facilitating a function of the electrode catalyst layer 3. Further, platinum black also functions as an electron conductive path for conducting electrons e⁻ as shown in FIG. 3. Moreover, an ionization tendency thereof is too low to elute, allowing the platinum black to be preferably used for the noble metallic nanoparticles 51.

The content of the noble metallic nanoparticles 51 may be 0.05-1 mg/cm² per unit projected area. Note the unit projected area is a scale of a criterion for evaluating performance by current density.

If the content of the noble metallic nanoparticles 51 becomes less than 0.05 mg/cm² per unit projected area, it is impossible to rapidly supply a large amount of water to the electrode catalyst layer when the vicinity of the electrodes becomes a highly dry state, and rapidly remove a large amount of water from the electrode catalyst layer when the vicinity of the electrodes becomes a highly humid state.

On the other hand, if the content of the noble metallic nanoparticles 51 becomes more than 1 mg/cm² per unit projected area, the achieved effects come into a plateau, and further, the costs are increased, resulting in the unfavorable state.

Accordingly, it is preferable that the content of the noble metallic nanoparticles 51 is determined as 0.05-1 mg/cm² per unit projected area.

Among the intermediate layers 5, particularly, the content of the noble metallic nanoparticles 51 used at the cathode Ca side is preferably determined as 0.1-0.5 mg/cm² per unit projected area.

Such a range of the content of the noble metallic nanoparticles 51 enables the aforementioned drawbacks and the performance deterioration in a long-term use to be suppressed.

If the content of the noble metallic nanoparticles 51 in the intermediate layer 5a used at the cathode Ca side becomes less than 0.1 mg/cm² per unit projected area, a sufficient amount of the noble metallic nanoparticles 51 may not be contained, resulting in difficulty of suppressing the performance deterioration in a long-term use.

On the other hand, if the content of the noble metallic nanoparticles 51 in the intermediate layer 5a used at the cathode Ca side becomes more than 0.5 mg/cm² per unit projected area, a large thickness of the intermediate layer 5 decreases the gas permeability to the electrode catalyst layer 3a, resulting in the deterioration in the initial performance.

Accordingly, it is preferable to determine the content of the noble metallic nanoparticles 51 in the intermediate layer 5a used at the cathode Ca side as 0.1-0.5 mg/cm² per unit projected area.

Further, a mean particle diameter of the noble metallic nanoparticles 51 is preferably determined, for example, as 4-20 nm. Such a range of the mean particle diameter of the noble metallic nanoparticles 51 enables the effect of rapidly supplying a large amount of water to the electrode catalyst layer when the vicinity of the electrodes becomes highly dry to be more certainly secured. In contrast, such a range of the mean particle diameter enables the effect of rapidly removing a large amount of water from the electrode catalyst layer when the vicinity of the electrodes becomes highly humid to be more certainly secured. Moreover, even though high potential is generated, the noble metallic particles 51 are hard to elute. Further, together with this, the large specific surface area and the high activity of the nanoparticles 51 allow the performance deterioration in the long-term use to be suppressed.

However, if the mean particle diameter of the noble metallic nanoparticles 51 is less than 4 nm, when high potential is generated, the noble metallic particles 51 are easy to elute, leading to deterioration of the initial performance when the nanoparticles are used.

On the other hand, if the mean particle diameter of the noble metallic nanoparticles 51 is more than 20 nm, decrease in the specific surface area reduces the water supplying performance. Hereby, when the vicinity of the electrodes becomes a highly dry state, the effect of rapidly supplying a large amount of water to the electrode catalyst layer may not be achieved. Similarly, when the vicinity of the electrodes becomes a highly humid state, the effect of rapidly removing a large amount of water from the electrode catalyst layer may not be achieved. Accordingly, the change in the surroundings of power generation, that is, the change in the humidity conditions in the vicinity of the electrodes makes the power generation performance tend to be unstable.

Therefore, it is preferable to determine the mean particle diameter of the noble metallic nanoparticles 51 as 4-20 nm.

Among the intermediate layers 5, it is preferable to determine the mean particle diameter of the noble metallic nanoparticles 51 particularly used in the intermediate layer 5a at the cathode Ca side as 4-7 nm.

Such a range of the mean particle diameter of the noble metallic nanoparticles 51 enables the specific surface area of the nanoparticles 51 to be large, the activity of the nanoparticles 51 to be high, and the noble metallic nanoparticles 51 to be prevented from eluting, even though high potential is generated. Accordingly, the performance deterioration in the long-term use may be suppressed.

Herein, if the mean particle diameter of the noble metallic nanoparticles 51 used in the intermediate layer 5a at the cathode Ca side is less than 4 nm, the specific surface area of the nanoparticles increases and the activity thereof is improved, leading to the assumption in the improvement of the initial performance. However, this facilitates the noble metallic nanoparticles 51 to easily elute when the high potential is generated, which makes the performance deterioration easily proceed in the long-term use.

In contrast, if the mean particle diameter of the noble metallic nanoparticles 51 is more than 7 nm, the noble metallic nanoparticles 51 are hard to easily elute even when the high potential is generated, allowing the performance deterioration in the long-term use to be relieved. However, this construction makes the specific surface reaction decrease and the activity deteriorate, whereby the initial performance is decreased.

Accordingly, it is preferable to determine the mean particle diameter of the noble metallic nanoparticles 51 used in the intermediate layer 5a at the cathode Ca side as 4-7 nm.

The composition including the aforementioned noble metallic nanoparticles 51 may obtain such merits as described in Table 1 listed below in comparison to the conventional examples, for example, Patent Document 2 (Japanese Unexamined Patent Application Publication No. 2006-107752).

TABLE 1

| Intermediate Layer | Noble Metallic Nanoparticles (Platinum Black) | Water Absorbent (Conventional Example) |
|---|---|---|
| Basic Mechanism for Reserving Water | Physical water reserve on surface of platinum black. More specific surface area may reserve more quantity of water. | Water reserve due to acid concentration of water absorbent. (Chemical adsorption: holding water placed between sulfonic groups. Slow supplying/removing speed. |
| Preparation Ink Quantity | Easy to prepare. Advantageous due to more specific surface area. Change in thickness of MEA for fuel cell is extremely small. | Easy to prepare. Possible to increase the quantity corresponding to the addition amount. However, this increases thickness of MEA for fuel cell. |
| Change in Surroundings | Little change due to physical adsorption. | High dry state decreases the volume, resulting in decrease in buffering function. |
| Water Supplying/ Removing Rate | Rapid | Slow |
| Inhibition on Gas Flow | Small inhibition on gas flow due to no expansion in high humidity state. | Large inhibition on gas flow due to expansion in high humidity state. |

The same electrode electrolyte in the electrode catalyst layer 3 may be used as the electrode electrolyte 52, or a different electrode electrolyte may be used.

An electrode electrolyte (or ion conductive polymer) used in the electrode electrolyte 52 includes, for example, powder and a dispersion liquid of NAFION® (registered trademark) (DuPont); powder and a dispersion liquid of ACIPLEX® (ASAHI KASEI CO.); and powder and a dispersion liquid of FLEMION® (registered trademark) (ASAHI GLASS CO., LTD.). One member selected from the above mentioned agents may be used as the electrode electrolyte used in the electrode electrolyte 52, or two or more members may be selected and used together.

The content of the electrode electrolyte 52 is preferably determined as 20-25 mass % of the content of the noble metallic nanoparticles 51.

Such a range of the content of the electrode electrolyte 52 enables the electrode electrolyte to be contained in a sufficient amount, thereby to certainly conduct protons. Hereby, this allows the initial performance to be heightened.

If the content of the electrode electrolyte is less than 20 mass % to the content of the noble metallic nanoparticles 51, the insufficient conductivity of protons $H^+$ deteriorates the initial performance. Further, the noble metallic nanoparticles 51 and the carbon powder are unable to be bound together, resulting in the occurrence of dropping out. Thus, the intermediate layer 5 is difficult to be formed.

On the other hand, if the content of the electrode electrolyte 52 is more than 25 mass % to the content of the noble metallic nanoparticles 51, the micropores inside the intermediate layer 5 are formed insufficiently. Hereby, the gas diffusion property inside the intermediate layer 5 and the gas permeability to the electrode electrolyte 3 decrease, resulting in the deterioration of the initial performance.

Accordingly, it is preferable to determine the content of the electrode electrolyte 52 as 20-25 mass % of the content of the noble metallic nanoparticles 51.

Further, the electrode electrolyte 52 includes carbon powder not shown in FIG. 3, that is, carbon black. The addition of the carbon powder to the electrode electrolyte 52 enables viscosity of an electrode ink to be increased when the membrane electrode assembly 1 for the polymer electrolyte fuel cell 10 is produced. Hereby, when the electrode ink is applied onto the electrode catalyst layer 3 or the gas diffusion layer 4, the above mentioned effect may prevent micropores for passing the reaction gases from being choked; the choke being caused by the soak of the electrode ink into the adjacent layer. This may suppress a defect of the resultant product.

The carbon powder includes, for example, furnace black, acetylene black, ground powder of glassy carbon, vapor-grown carbon fiber, and graphitization treated above mentioned materials. Furnace black includes, for example, KETCHEN BLACK EC, KETCHEN BLACK EC-600JD (KETCHEN BLACK INTERNATIONAL CO.), VULCAN (registered trademark) XC-72 (CA BOT CO.), and TOKA-BLACK (product name) (TOKAI CARBON CO., LTD.). Acetylene black includes, for example, DENKA BLACK (registered trademark) (DENKI KAGAKU KOGYO KABUSHIKI KAISYA). Vapor-grown carbon fiber includes, for example, VGCF (registered trademark) and VGCF-H (registered trademark) (SHOWA DENKO K. K.). The carbon powders used for the electrode electrolyte 52 may be used by selecting one member from the above mentioned agents, or two or more members may be selected to use them together. Above all, for example, fibrous carbon such as vapor-grown carbon fiber is preferably used in order to secure the micropores and the function as a support column.

The content of the carbon powder is preferably determined as 15-45 mass % to the content of the noble metallic nanoparticles 51.

Such a content of the carbon powder enables the micropores inside the intermediate layer 5 to be sufficiently secured, allowing the gas diffusion property inside the intermediate layer 5 and the gas permeability to the electrode catalyst layer 3 to be enhanced. Hereby, this enables not only the initial performance to be enhanced but also the performance deterioration in the long-term use to be suppressed.

If the content of the carbon powder is less than 15 mass % to the content of the noble metallic nanoparticles 51, the micropores inside the intermediate layer 5 are formed insufficiently. Hereby, the gas diffusion property inside the intermediate layer 5 and the gas permeability to the electrode catalyst layer 3 are reduced, whereby the initial performance is reduced. Further, corrosion of the carbon when high potential is generated makes the content ratio of the electrode electrolyte 52 of the intermediate layer 5 increase and the hydrophilicity thereof also increase, whereby the performance deterioration in the long-term use is easy to progress.

On the other hand, if the content of the carbon powder is more than 45 mass % to the content of the noble metallic nanoparticles 51, the thickness of the intermediate layer 5 becomes thicker and the gas permeability to the electrode catalyst layer 3 is reduced, resulting in the deterioration of the initial performance.

Accordingly, it is preferable to determine the content of the carbon powder is 15-45 mass % to the content of the noble metallic nanoparticles 51.

Next, will be explained the polymer electrolyte fuel cell using the membrane electrode assembly for the polymer electrolyte fuel cell of the present invention as mentioned hereinbefore.

Figure 4:
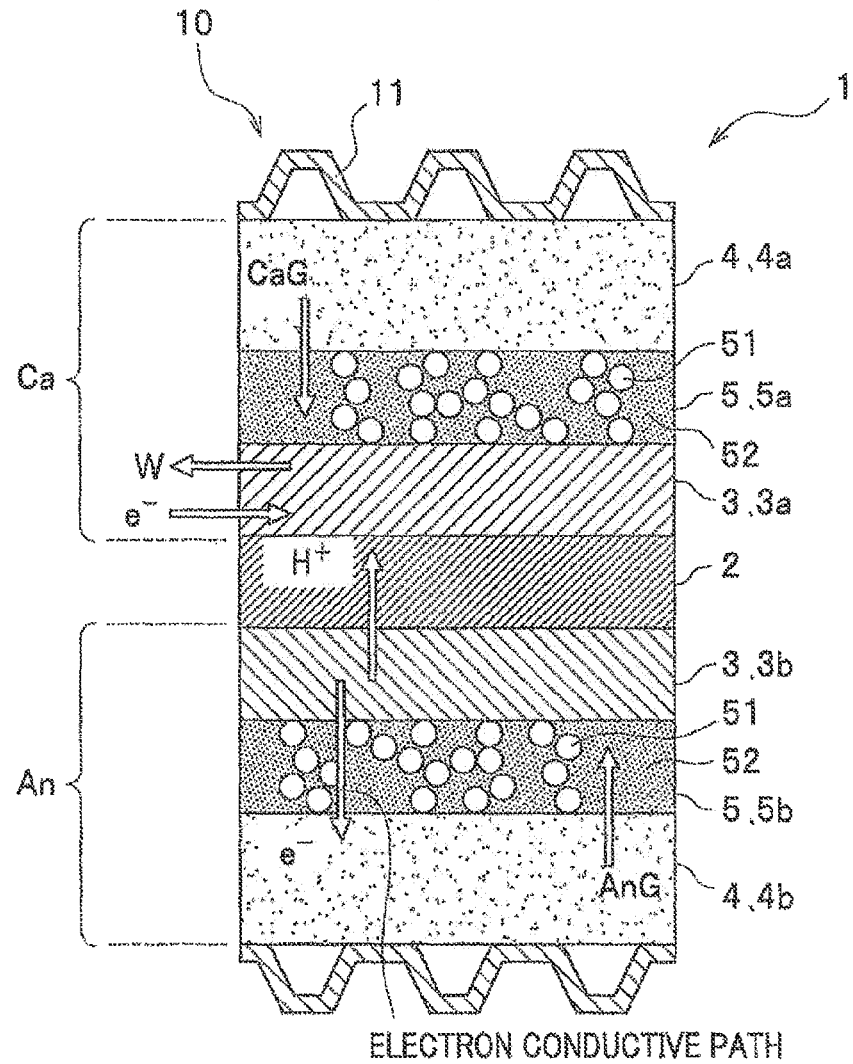
FIG. 4 is a cross-sectional schematic diagram explaining a construction of the polymer electrolyte fuel cell of the present invention.

As shown in FIG. 4, the polymer electrolyte fuel cell 10 is constructed by arranging a plurality of the membrane electrode assemblies 1 for the polymer electrolyte fuel cell 10 and a plurality of separators 11 disposed between the adjacent membrane electrode assemblies for the polymer electrolyte fuel cell (not shown) in the vertical direction.

Herein, the separator 11 comprises a gas inlet for letting the reaction gases flow in the vertical direction, formed at an upper part of the separator 11, and a gas outlet formed at a lower part of the separator 11.

Generally, if the membrane electrode assembly 1 for the polymer electrolyte fuel cell 10 and the separator 11 are arranged in the vertical direction, the gas flow and gravity make water produced in the electrode catalyst layer 3 being washed out downward to be easily discharged outside the system. Accordingly, the membrane electrode assembly 1 for the polymer electrolyte fuel cell 10 tends to become a highly dry state. However, the polymer electrolyte fuel cell 10 of the present invention is constructed by using the membrane electrode assembly 1 for the polymer electrolyte fuel cell 10 of which intermediate layer 5 contains the noble metallic nanoparticles 51, allowing a sufficient amount of water to be reserved in the intermediate layer 5. Hereby, even if the membrane electrode assembly 1 for the polymer electrolyte fuel cell 10 and the separator 11 are arranged in the vertical direction, the polymer electrolyte fuel cell 10 is very unlikely to come into a highly dry state.

EXAMPLES

Next, will be specifically explained the membrane electrode assembly for the polymer electrolyte fuel cell and the polymer electrolyte fuel cell of the present invention by comparing EXAMPLES which satisfy the requirements of the present invention to COMPARATIVE EXAMPLES which do not satisfy the requirements of the present invention.

1. Investigation of Basic Construction

Example 1

A membrane electrode assembly for a polymer electrolyte fuel cell of Example 1 was prepared in the steps of (1) to (7).
(1) Preparation of Proton Conductive Membrane A proton conductive membrane was prepared following the method described in Japanese Unexamined Patent Application Publication No. 2005-158265, in paragraphs [0066] to [0079]. More specific procedures were described below.

In the present Example, firstly, sodium 4-(2,5-dichlorobenzoyl)benzenesulfonate represented in the following formula (2) was prepared.

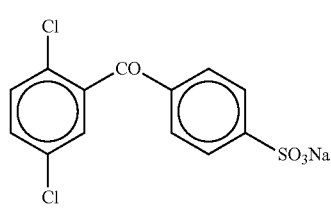

(2)

The compound represented in formula (2) was prepared as follows. First, was added 2,5-dichlorobenzophenone (137.3 g, ca. 500 mmol) to a three-necked flask (3 L) equipped with a stirrer and a condenser. Then 1,2-dichloroethane (500 mL) was added to dissolve the solid material. Further, a freshly prepared acetyl sulfate solution (2 mol/L) made from concentrated sulfuric acid (56 mL), acetic anhydride (152 mL) and 1,2-dichloroethane (400 mL) was added to the above prepared solution with stirring, and the reaction mixture was stirred at 60° C. in an oil bath for 3 hrs. After a predetermined time passed, 1-propanol (300 mL) was added to the reaction mixture to quench the reaction. Next, the reaction mixture was concentrated in vacuo to a volume of 400 mL, and a sodium hydroxyl aqueous solution (120 g, 3 mol/water 400 mL) was added thereto. The remaining 1,2-dichloroethan in the reaction mixture was azeotropically removed, the resultant transparent pale yellow solution was cooled, and precipitated sediment was filtered. The resultant sediment was dried at 70° C. in vacuo, thereby to obtain desired sodium 4-(2,5-dichlorobenzoyl)benzenesulfonate as a fine white powder (or crude crystals).

Then, the crude crystals were used without further purification, thereby to prepare 4-(2,5-dichlorobenzoyl)benzenesulfony chloride represented in the following formula (3).

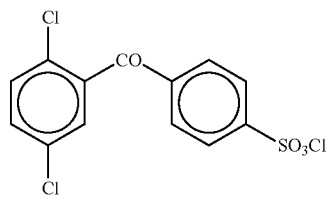

(3)

The compound represented in the formula (3) was prepared as follows. First, to the crude crystals of sodium 4-(2,5-dichlorobenzoyl)benzenesulfonate (215 g, ca. 400 mmol), was added acetonitrile (300 mL) and sulfolane (200 mL) as a solvent, and subsequently phosphorous trichloride (245.3 g, 1.6 mol) was added thereto, whereby the reaction mixture was stirred at 70° C. Further, N,N-dimethylacetamide (5 mL) was added, the resultant yellow suspension was stirred at 71-73° C. for 40 min, and cooled to 3° C. Then, cold water (1 L) was added to the reaction mixture at a speed so as not to exceed the temperature of the reaction mixture more than 10° C. The resulting precipitates were filtered, washed with cold water, and recrystallized in toluene (350 mL), to obtain desired 4-(2,5-dichlorobenzoyl)benzenesulfony chloride as white crystals (mp: 130.5-131.5° C.; yield: 135 g). Herein, the yield was 87% when calculated based on the amount of sodium 4-(2,5-dichlorobenzoyl)benzenesulfonate.

Next, by using 4-(2,5-dichlorobenzoyl)benzenesulfony chloride, sec-butyl 4-(2,5-dichlorobenzoyl)benzenesulfonate represented in the following formula (4) was prepared.

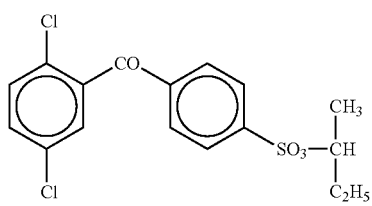

(4)

The compound represented in the formula (4) was prepared as follows. First, 4-(2,5-dichlorobenzoyl)benzenesulfony chloride (22.09 g, 50 mmol) and 2-methyl-1-propanol (4.0 g, 55 mmol) were separately added dropwisely, to a pyridine solvent (30 mL) over 40 min with mechanically stirring and cooling the reaction mixture. Accordingly, the resulting viscous suspension was further continuously stirred for 1 hr at 12-15° C. Next, concentrated hydrochloric acid (30 mL) and pieces of ice (100 g) were added all at once to the reaction mixture, and then the resultant suspension was stirred until the suspension gradually became homogeneous. Then, the suspension was rapidly filtered by a cold Büchner funnel, to collect white and sticky precipitates. Next, the precipitates were dissolved in ethyl acetate (300 mL), washed with water by a separatory funnel, and the organic layer was separated and dried over magnesium sulfate. The organic solvent was removed in vacuo to be concentrated. The concentrated resultant pale yellow oily liquid was dissolved in hot hexane (30 mL), left in a refrigerator for several days, to obtain desired sec-butyl 4-(2,5-dichlorobenzoyl)benzenesulfonate as white crystals (mp: 73-74° C.; yield: 70%).

Next, the oligomer represented in the following formula (5) was prepared.

in an oil bath under nitrogen atmosphere, and stirred at 130° C. Water produced in the reaction was azeotropically treated with toluene, as removing the water by the Dean-Stark apparatus to outside the apparatus. After 3 hrs, little formation of water was shown. Then, the reaction temperature was gradually increased from 130° C. to 150° C., thereby to remove almost toluene. After the reaction mixture was continuously heated for 10 hrs at 150° C., 4,4'-dichlorobenzophenone (10.0 g) was added to the reaction mixture, and the reaction mixture was further stirred for 5 hrs.

The obtained reaction mixture was allowed to cool, precipitates of an inorganic by-product were filtered to remove them, and the filtrate was poured into methanol (4 L). Then, a precipitated product was filtered, collected, dried, and dissolved in tetrahydrofuran (300 mL). The resultant solution was re-precipitated by adding methanol (4 L), to obtain an oligomer (95 g, yield: 85%) represented in the formula (5).

Next, polyarylenesulfonic acid sec-butyl ester was prepared represented in the formula (6).

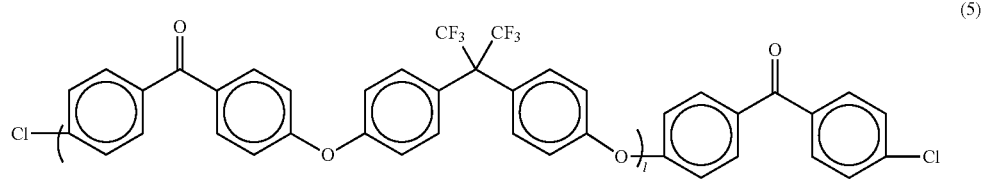
(5)

The oligomer represented in the following formula (5) was prepared as follows. First, to a three necked flask (1 L) equipped with a stirrer, a thermometer, a condenser, a Dean-Stark apparatus, and a three-way cock for introducing nitrogen gas, were added 2,2-bis(4-hydroxyphenyl)-1,1,1,3,3,3-hexafluoropropane (or Bisphenol AF) (67.3 g, 0.20 mol),

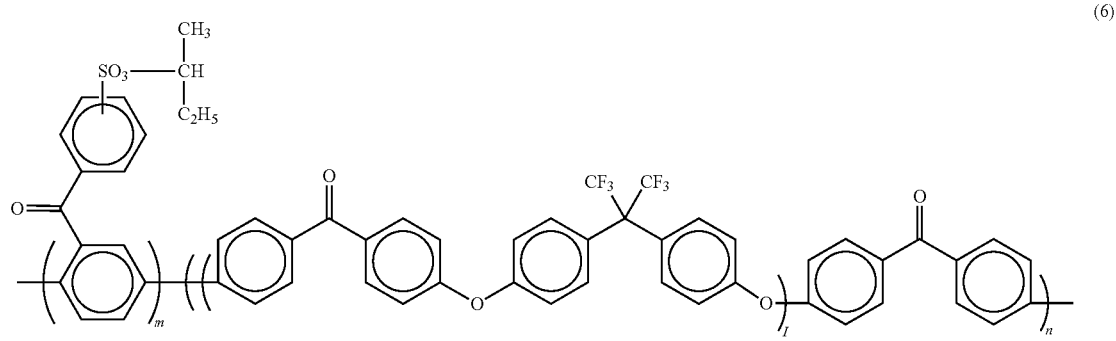
(6)

4,4'-dichlorobenzophenone (60.3 g, 0.24 mol), potassium carbonate (71.9 g, 0.52 mol), N,N-dimethylacetoamide (300 mL) and toluene (150 mL). The reaction mixture was heated The preparation of polyarylenesulfonic acid sec-butyl ester represented in the formula (6) was prepared as follows. First, to a mixture of sec-butyl 4-(2,5-dichlorobenzoyl)benzenesulfonate (15.34 g, 32 mmol), the oligomer represented in the formula (5) (the number average molecular weight: 7940; 10.52 g, 1.33 mmol), bis(triphenylphosphine)nickel (II) dichloride (0.65 g, 1 mmol), triphenylphosphine (33.50 g, 13.33 mmol), sodium iodide (0.65 g, 4.83 mmol), zinc powder (5.45 g, 83.33 mmol), anhydrous N-methyl-pyrrolidone (60 mL) was added under the nitrogen atmosphere.

The reaction mixture was heated with stirring, finally up to 74° C., and kept at the temperature for 3 hrs. During the reaction, increase in the viscosity of the reaction mixture was observed. Then, the obtained polymer reaction solution was diluted with tetrahydrofuran (250 mL), and the solution was stirred for 30 min. The resultant reaction mixture was filtered by Celite as a synergy filter aid, and then the filtrate was poured into a large excess volume of methanol (1500 mL), to solidify the mixture. The solidified substrate was filtered, dried in air, re-dissolved in a mixed solvent of tetrahydrofuran (200 mL)/N-methyl-pyrrolidone (30 mL), and finally poured into a large excess methanol (1500 mL) to be solidified and precipitated. After drying in air and heated to be dried, polyarylenesulfonic acid sec-butyl ester (20.54 g) represented in the formula (6) was obtained (yellow flake-like crystals, yield: 78%).

Next, polyarylenesulfonic acid sec-butyl ester (5.08 g) represented in the formula (6) was dissolve in N-methyl-pyrrolidone (60 mL), and the solution was heated to 90° C. Then, to the reaction mixture, was added all at once a mixture of methanol (50 mL) and concentrated hydrochloric acid (8 mL). The resultant suspension was heated under a mild refluxed condition and continuously heated for 10 hrs. Then, a distillation apparatus was attached to the reaction flask to remove the excess methanol by distillation, whereby sulfonated polyarylene represented in the formula (1) was obtained as a pale green transparent solution.

TEC36F52) and further vapor growth carbon fibers (10 g: SHOWA DENKO K.K., trade name: VGCF).

Then, an ion conductive resin solution (80 g: 20% solution, DuPont, trade name: DE2020) was added and shaken by a three dimensional mixer for 10 min.

Then, the mixed solution was stirred by a planetary ball mill under the condition of 80 rpm×120 min to homogenize the mixture, whereby a cathode electrode ink was prepared.

(3) Preparation of Cathode Electrode Sheet

The cathode electrode ink prepared in the section (2) was applied onto a PET film by screen printing such that the amount of platinum in the cathode electrode ink became 0.5 mg/cm$^2$, heated at 60° C. for 10 min, further heated at 100° C. for 15 min in vacuo to be dried, thereby to produce a cathode electrode sheet (or electrode catalyst layer).

(4) Preparation of Anode Electrode Ink and Anode Electrode Sheet

First, was prepared a solvent comprising normal propyl alcohol (NPA) and water in a mass ratio of 2:1. To the solvent (180 g), were added platinum catalyst for a fuel cell (30 g: TANAKA KIKINZOKU KOUGYO, catalyst for a fuel cell TEC36F52) and further vapor growth carbon fibers (7 g: SHOWA DENKO K.K., trade name: VGCF).

Then, an ion conductive resin solution (70 g: 20% solution, DuPont, trade name: DE2020) was added and shaken by a three dimensional mixer for 10 min.

Next, the mixed solution was stirred by a planetary ball mill under the condition of 80 rpm×120 min to homogenize the mixture, whereby an anode electrode ink was prepared.

The prepared anode ink was applied onto a PET film by screen printing such that the amount of platinum in the anode electrode ink became 0.2 mg/cm$^2$, heated at 60° C. for 10 min, heated at 100° C. for 15 min in vacuo, to be dried, thereby to produce an anode electrode sheet (or electrode catalyst layer).

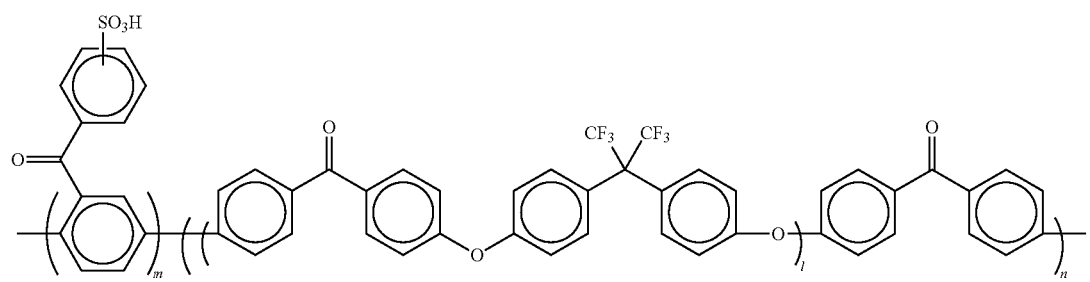

(1)

Herein, the above formula (1) means that m:n=0.5-100: 95.5-0; preferably m:n=0.5-99.999:95.5-0.001; l=a positive integer.

Next, the pale green transparent solution was casted on a glass plate to form a membrane. After formation of the membrane, the casted product was immersed in water for 3 days. The resulting membrane was dried in air, subsequently in vacuo, to obtain a proton conductive membrane with a dried membrane thickness of 50 μm (in Table 2 described hereinafter, the membrane is called PEM species "HC-based").

An ion exchange capacity (or IEC) of the obtained proton conductive membrane was measured by a neutralization analysis, resulting in 2.2 meq/g (or milli-equivalent/g).

(2) Preparation of Cathode Electrode Ink

First, was prepared a solvent comprising normal propyl alcohol (NPA) and water in a mass ratio of 1:2. To the solvent (180 g), were added platinum catalyst for a fuel cell (30 g: TANAKA KIKINZOKU KOUGYO, catalyst for a fuel cell (5) Preparation of Gas Diffusion Layer A mixture made by mixing carbon black (KETCHEN BLACK EC, MITSUBISHI CHEMICAL CO.) and polytetrafluoroethylene (PTFE) particles (TEFLON(trade mark) 640J; DU PONT-MITSUI FLUORO-CHEMICALS CO., LTD.) in the mass ratio of 4:6 was homogeneously dispersed in ethylene glycol, to prepare a slurry.

Then, the prepared slurry was applied to a plane surface of carbon paper TGP-H060 (TORAY INDUSTRIES, INC.) to form a backing layer after drying, whereby a gas diffusion layer comprising the carbon paper and the backing layer was prepared.

(6) Preparation of Intermediate Layer

First, was prepared a solvent comprising normal propyl alcohol (NPA) and water in a mass ratio of 1:2. To the solvent (50 g), were added platinum black powder (10 g: TANAKA KIKINZOKU KOUGYO, catalyst for a fuel cell TEC90400) and further vapor growth carbon fibers (2 g: SHOWA DENKO K.K., trade name: VGCF). Herein, a mean particle diameter of the platinum black powder was 4.6 nm.

Then, an ion conductive resin solution (10 g: 20% solution, DuPont, trade name: DE2020) was added and shaken by a three dimensional mixer for 10 min.

Next, the mixed solution was stirred by a planetary ball mill under the condition of 80 rpm×60 min to homogenize the mixture, whereby an intermediate layer ink was prepared. The prepared intermediate layer ink was applied onto the backing layer of the gas diffusion layer produced in the section (5) by screen printing such that the amount of platinum became 0.2 mg/cm$^2$, and was dried, thereby to produce an intermediate layer.

(7) Preparation of Proton Conductive Membrane

The proton conductive membrane prepared in the section (1) was sandwiched such that the proton conductive membrane contacted with the applied electrode surface of the anode electrode sheet and the applied electrode surface of the cathode electrode sheet. Then, the sandwiched assembly was hot pressed for 8 min under the condition of 120° C. and 2.0 MPa. Then, releasing-off of the PET sheets from the anode electrode sheet and the cathode electrode sheet allowed conductive conjugate membranes (CCM) each forming an electrode layer on the proton conductive membrane to be produced.

Next, two sheets of the gas diffusion layers each having the intermediate layer prepared in the section (6) were prepared. Then, the CCM was sandwiched between these intermediate layers of the gas diffusion layers, and the sandwiched assembly was integrated via the hot pressing process for 12 min under the condition of 150° C. and 2.5 MPa, thereby to produce a membrane electrode assembly (MEA) for a polymer electrolyte fuel cell.

Comparative Example 1

In Comparative Example 1, an MEA was prepared in the same composition and the method as in Example 1 except that platinum black powder was not used in the preparation of the intermediate layer described in the section (6) of Example 1.

Example 2

In Example 2, an MEA was prepared in the same method as in Example 1 except that 13.04 g of sec-butyl 4-(2,5-dichlorobenzoyl)benzenesulfonate represented in the formula (4) was used in the preparation of the proton conductive membrane described in the section (1) of Example 1.

Comparative Example 2

In Comparative Example 2, an MEA was prepared in the same composition and the method as in Example 2 except that platinum black powder was not used in the preparation of the intermediate layer described in the section (6) of Example 1.

Example 3

In Example 3, an MEA was prepared in the same method as in Example 1 except that 11.82 g of sec-butyl 4-(2,5-dichlorobenzoyl)benzenesulfonate represented in the formula (4) was used in the preparation of the proton conductive membrane described in the section (1) of Example 1.

Comparative Example 3

In Comparative Example 3, an MEA was prepared in the same composition and the method as in Example 3 except that platinum black powder was not used in the preparation of the intermediate layer described in the section (6) of Example 1.

Example 4

In Example 4, an MEA was prepared in the same method as in Example 1 except that 16.87 g of sec-butyl 4-[4-(2,5-dichlorobenzoyl)benzenesulfonate represented in the formula (4) was used in the preparation of the proton conductive membrane described in the section (1) of Example 1.

Comparative Example 4

In Comparative Example 4, an MEA was prepared in the same composition and the method as in Example 4 except that platinum black powder was not used in the preparation of the intermediate layer described in the section (6) of Example 1.

Example 5

In Example 5, an MEA was prepared in the same method as in Example 1 except that 17.64 g of sec-butyl 4-(2,5-dichlorobenzoyl)benzenesulfonate represented in the formula (4) was used in the preparation of the proton conductive membrane described in the section (1) of Example 1.

Comparative Example 5

In Comparative Example 5, an MEA was prepared in the same composition and the method as in Example 5 except that platinum black powder was not used in the preparation of the intermediate layer described in the section (6) of Example 1.

Example 6

In Example 6, an MEA was prepared in the same method as in Example 1 except that a commercially available fluorine based electrolyte (NAFION® (registered trademark) N112 DuPont; hereinafter, in Table 2, called PEM species "F-based") as a proton conductive membrane was used in the preparation of the proton conductive membrane described in the section (1) of Example 1.

Comparative Example 6

In Comparative Example 6, an MEA was prepared in the same composition and the method as in Example 6 except that platinum black powder was not used in the preparation of the intermediate layer described in the section (6) of Example 1.

Note NAFION® ((registered trademark) N112; DuPont) was used as a proton conductive membrane.

Example 7

In Example 7, an MEA was prepared by vertically arranging the same method as in Example 1 between the separators 11 shown in FIGS. 5A and 5B (then, the MEA was placed in the horizontal direction) (in the following Table 2, called PEM species "HC-based; sideways". Herein, the MEA was arranged such that the gas inlet 11*a* for the reaction gases was located at an upper part of the separator 11 and the gas outlet 11*b* for the reaction gases was located at a lower part of the separator 11.

Comparative Example 7

In Comparative Example 7, an MEA was prepared in the same method as in Example 7 except that platinum black powder was not used in the preparation of the intermediate layer described in the section (6) of Example 1.

Comparative Example 8

In Comparative Example 8, an MEA was prepared in the same method as in Example 1 except that the intermediate layer described in the section (6) of Example 1 was prepared as the followings.

The intermediate layer of Comparative Example 8 was produced in the steps of: preparing a solvent comprising normal propyl alcohol (NPA) and water in a mass ratio of 1:2; adding platinum catalyst supported on carbon powder (18 g: TANAKA KIKINZOKU KOUGYO, catalyst for a fuel cell TEC10EA30E) and further vapor growth carbon fibers (3 g: SHOWA DENKO K.K., trade name: VGCF) to the solvent.

Then, an ion conductive resin solution (20 g, 20% solution; DuPont, trade name: DE2020) was added and the reaction mixture was shaken for 10 min by a three dimensional mixer.

After that, the mixed solution was stirred by a planetary ball mill under the condition of 80 rpm×60 min to homogenize the mixture, whereby an intermediate layer ink was prepared.

The produced intermediate layer ink was applied onto a backing layer of a gas diffusion layer prepared in the same method as in the section (5) of Example 1 via screen printing such that the amount of platinum became 0.2 mg/cm² per unit projected area. The resultant product was dried to produce an intermediate layer.

[Evaluation of Stability on Power Generation Performance]

The prepared MEAs in Examples 1-7 and Comparative Examples 1-8 were evaluated on the stability in the power generation performance. The MEAs were evaluated under the following conditions.

Figure 5A:
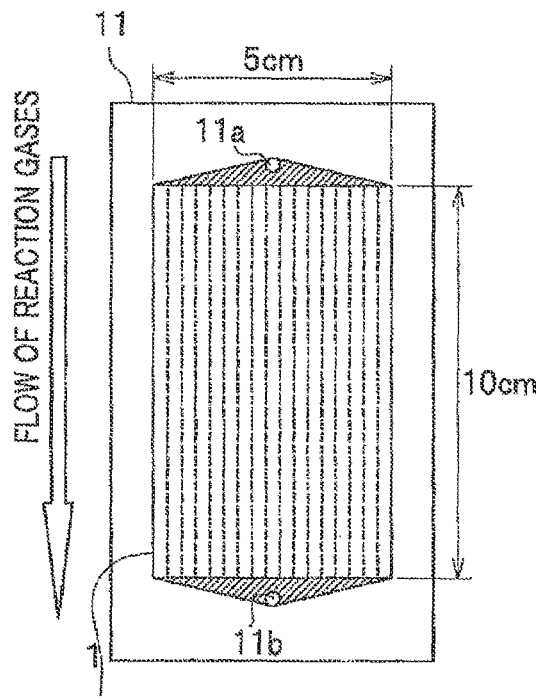
FIGS. 5A and 5B are plan views explaining separators used in Example 7 and Comparative Example 7.
Figure 5B:
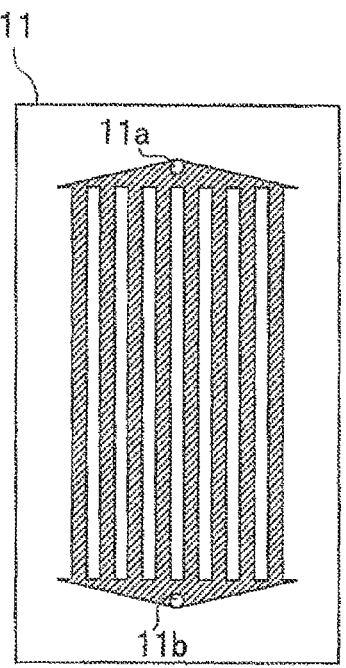
Figure 6:
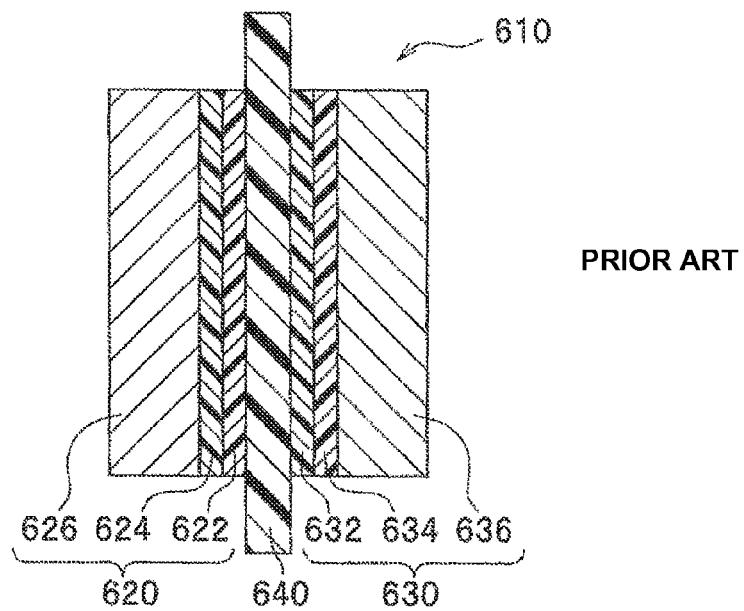
FIG. 6 is a cross-sectional diagram explaining an example of a conventional membrane electrode assembly for a polymer electrolyte fuel cell.
Figure 7:
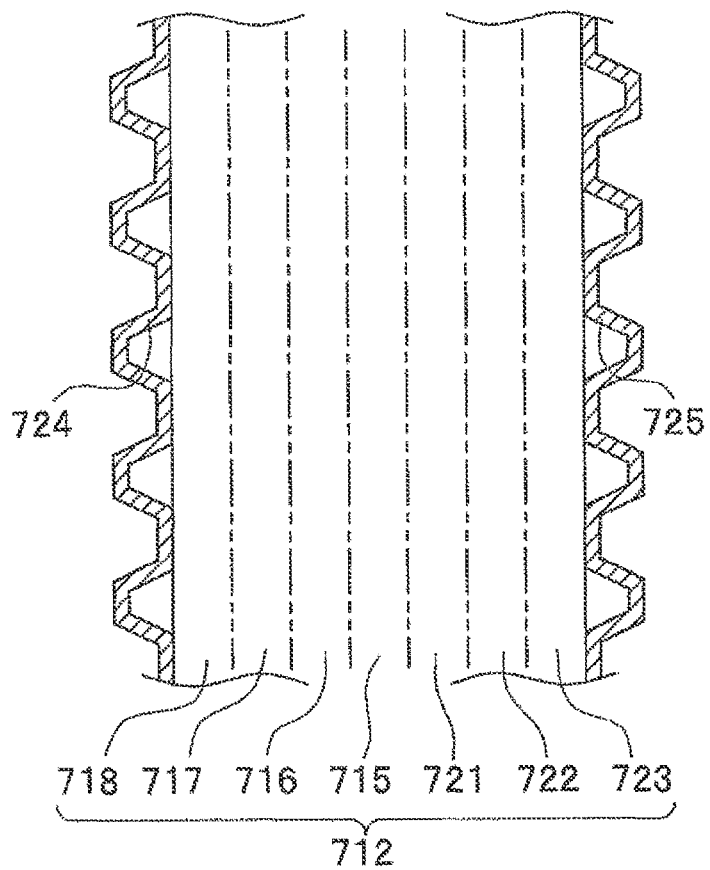
FIG. 7 is a cross-sectional diagram explaining another example of a conventional membrane electrode assembly for a polymer electrolyte fuel cell.

The stability on the power generation performance was evaluated by a JARI (Japan Automobile Research Institute) standard cell of which electrode area was 25 cm² (Note in Example 7 and Comparative Example 7, each electrode area was 50 cm²; see FIGS. 5A and 5B). The cell temperature was 70° C. Pure hydrogen was used as the anode gas and air was used as the cathode gas. Each gas flow was set in parallel. Note the material of the separator was carbon, and the gas passage had a height of 2 mm and a groove width of 2 mm.

Each gas pressure of the anode gas and the cathode gas was 100 kPa, having humidity conditions of 50/50% Rh, 75/75% Rh and 100/100% Rh. Under the respective humidity conditions, a cell voltage was measured when electric power generated in the current density of 1 A/cm², and standard deviations (mV) of the respective cell voltages were calculated, thereby to set the values as indexes for evaluating the stability on the power generation.

Table 2 below shows the evaluation of the stability on the power generation. Herein, the standard deviation (mV) in Table 2 indicates how much the measured cell voltage (mV) is different from the cell voltage (mV) detected under the humidity condition of 75/75% Rh in the reaction gas. This value indicates magnitude of the variation suppression effect under each humidity condition. Further, the ion exchange capacities (IECs) in Examples 2-7 and Comparative Examples 1-8 were also measured the same as in Example 1 and listed in Table 2.

TABLE 2

|  | MEA specification | | | Performance per humidity (Anode/Cathode) [mV] | | | Standard deviation of cell |
| --- | --- | --- | --- | --- | --- | --- | --- |
|  | Intermediate layer | PEM species | IEC [meq/g] | 50/50% Rh | 75/75% Rh | 100/100% Rh | voltage [mV] |
| Comparative Example 1 | No platinum black | HC-based | 2.2 | 624 | 660 | 650 | 18.6 |
| Example 1 | Platinum black | HC-based | 2.2 | 649 | 666 | 663 | 9.1 |
| Comparative Example 2 | No platinum black | HC-based | 1.9 | 602 | 643 | 649 | 25.6 |
| Example 2 | Platinum black | HC-based | 1.9 | 639 | 651 | 650 | 6.7 |
| Comparative Example 3 | No platinum black | HC-based | 1.7 | 541 | 618 | 629 | 47.9 |
| Example 3 | Platinum black | HC-based | 1.7 | 578 | 627 | 638 | 31.9 |
| Comparative Example 4 | No platinum black | HC-based | 2.4 | 633 | 658 | 627 | 16.4 |
| Example 4 | Platinum black | HC-based | 2.4 | 650 | 659 | 640 | 9.5 |
| Comparative Example 5 | No platinum black | HC-based | 2.5 | 608 | 619 | 514 | 57.7 |
| Example 5 | Platinum black | HC-based | 2.5 | 613 | 624 | 541 | 45.1 |
| Comparative Example 6 | No platinum black | F-based | 1.1 | 628 | 641 | 614 | 13.5 |
| Example 6 | Platinum black | F-based | 1.1 | 638 | 649 | 628 | 10.5 |
| Comparative Example 7 | No platinum black | HC-based: sideways | 2.2 | 602 | 654 | 641 | 27.1 |
| Example 7 | Platinum black | HC-based: sideways | 2.2 | 643 | 658 | 659 | 9 |
| Comparative Example 8 | platinum supported on carbon powder | HC-based | 2.2 | 621 | 663 | 665 | 24.8 |

As shown in Table 2, each Example had a smaller standard deviation than that of each Comparative Examination corresponding to the same number of the Example. That is, this demonstrated that each Example had a larger modification suppression effect than the corresponding Comparative Example.

Note it was shown that the MEAs of which IECs were 1.9 meq/g and 2.2 meq/g had larger variation suppression effects of the cell voltages by adding platinum black to the intermediate layers.

Further, it was also shown that the MEA of which IEC was low (for example, IEC=1.7 meq/g) had a low voltage due to the deterioration of the conductivity by the lack of water when the humidity became low (for example, 50/50% Rh), while the MEA of which IEC was high (for example, IEC=2.5 meq/g) had a low voltage due to the flooding when the humidity became high (for example, 100/100% Rh).

Moreover, it was shown that in Example 7 even though the cell was placed in the horizontal direction, the variation suppression effect was larger than that of Comparative Example 1.

Further, in Comparative Example 8, the voltage at low humidity was decreased. This may be caused because carbon in the platinum supported on carbon powder had the water repellency, hereby produced water was rapidly discharged to become a dry state.

2. Investigation of Optimal Conditions

Next, optimal conditions of the intermediate layer at the cathode side was investigated, including a thickness of the intermediate layer, content of the noble metallic nanoparticles, content of the carbon powder, content of the electrolyte, and a mean particle diameter of the noble metallic nanoparticles.

The optimal conditions were investigated in Examples 8-10 and Comparative Examples 9-12. The MEAs in Examples 8-10 and Comparative Examples 9-12 were prepared in the steps (1)-(10) as follows.

(1) Preparation of Cathode Electrode Ink

First, was prepared a solvent comprising normal propyl alcohol (NPA) and water in amass ratio of 1:2. Then, the solvent was added in the ten-fold amount of a mass ratio to the platinum catalyst for a fuel cell (TANAKA KIKINZOKU KOUGYO, catalyst for a fuel cell TEC36F52).

Then, as an ion conductive resin solution, a solution of a perfluoroalkylene sulfonic acid polymer (NAFION® (registered trademark), DuPont, D2020) was added such that the mass ratio between the platinum catalyst for a fuel cell and the polymer in the ion conductive resin solution became 1:1.5.

Then, a mixed solution prepared by stirring the solution until the ink viscosity became a predetermined value was shaken by a planet ball mill in the conditions of 80 rpm×120 min to be homogeneous, whereby a cathode electrode ink was produced.

(2) Preparation of Cathode Electrode Sheet

The cathode electrode ink was applied onto a PET film by screen printing such that the amount of platinum in the cathode electrode ink prepared in the section (1) became 0.5 mg/cm$^2$, heated at 60° C. for 10 min, further heated at 100° C. for 15 min in vacuo to be dried, thereby to produce a cathode electrode sheet (or electrode catalyst layer).

(3) Preparation of Anode Electrode Ink and Anode Electrode Sheet

First, was prepared a solvent comprising normal propyl alcohol (NPA) and water in amass ratio of 1:2. Then, the solvent was added in 10-fold amount of amass ratio to the platinum catalyst for a fuel cell (TANAKA KIKINZOKU KOUGYO, catalyst for a fuel cell TEC10EA50E).

Then, as an ion conductive resin solution, a perfluoroalkylene sulfonic acid polymer (NAFION® (registered trademark), DuPont, D2020) was added such that the mass ratio between the platinum catalyst for a fuel cell and the polymer in the ion conductive resin solution became 1:1.

Then, a mixed solution prepared by stirring the solution until the ink viscosity became a predetermined value was shaken by a planet ball mill in the conditions of 80 rpm×120 min to be homogeneous, whereby an anode electrode ink was produced.

The prepared anode electrode ink was applied onto a PET film by screen printing such that the amount of platinum in the anode electrode ink became 0.2 mg/cm$^2$, heated at 60° C. for 10 min, further heated at 100° C. for 15 min in vacuo to be dried, thereby to produce an anode electrode sheet (or electrode catalyst layer).

(4) Preparation of Gas Diffusion Layer

The gas diffusion layer was prepared in the same method as described in the section 1. (5) "Preparation of Gas Diffusion Layer".

(5) Preparation of Intermediate Layer

First, was prepared a solvent comprising normal propyl alcohol (NPA) and water in a mass ratio of 1:2. To the solvent (25 g), was added platinum black powder (5 g: TANAKA KIKINZOKU KOUGYO, catalyst for a fuel cell TEC90300). Then, the carbon black (VULCAN XC-72 (registered trademark), CABOT CO.) was added in the amount [g] of respective Examples 8-10 and Comparative Examples 9-12 shown in Table 3. Herein, a mean particle diameter of the platinum black powder was 4.6 nm.

Then, an ion conductive resin solution (20% solution, DuPont, trade name: D2020) was added in the amount (solution (g)) shown in Table 3, and shaken for 10 min by a three dimensional mixer.

After that, a mixed solution was shaken by a planet ball mill in the conditions of 80 rpm×60 min to be homogeneous, whereby an intermediate layer ink was produced.

The intermediate layer ink was applied onto a backing layer of the gas diffusion layer prepared in the section (4) by screen printing such that the amount of platinum became a predetermined value [mg/cm$^2$] listed in Table 3 described below, and heated to be dried, thereby to produce intermediate layers of Examples 8-10 and Comparative Examples 9-12.

(6) Preparation of Proton Conductive Membrane

As a proton conductive membrane, a commercially available fluorine based electrolyte membrane (NAFION® (registered trade-mark) N112, DuPont) was used.

The proton conductive membrane was sandwiched such that the proton conductive membrane contacted with the applied electrode surface of the anode electrode sheet and the applied electrode surface of the cathode electrode sheet. Then, the sandwiched assembly was hot pressed for 8 min under the condition of 120° C. and 2.0 MPa. Then, releasing-off of the PET sheets from the anode electrode sheet and the cathode electrode sheet allowed conductive conjugate membranes (CCM) each forming an electrode layer on the proton conductive membrane to be produced.

Next, one by one sheet of the respective intermediate layers of Examples 8-10 and Comparative Examples 9-12 prepared in the section (5) was prepared. Then, those anode side gas diffusion layers, the CCMs, the intermediate layers (or cathode side intermediate layers) prepared in the section (5), and the cathode side gas diffusion layers were stacked in this order, and the resultant assembly was integrated via the hot pressing process for 12 min under the condition of 150° C.

and 2.5 MPa, thereby to produce a membrane electrode assembly (MEA) for a polymer electrolyte fuel cell.

Note a thickness of each intermediate layer of the MEA was measured by analyzing a cross-sectional photograph obtained by an electron microscope. The thickness [μm] was listed in Table 3.

TABLE 3

|  | Carbon black | | Ion conductive resin solution | | Platinum | |
| --- | --- | --- | --- | --- | --- | --- |
|  | Mass [g] | Mass % to content of platinum black powder | mass [g (solution)] | mass % of solid to content of platinum black powder | black powder (unit projected area) [mg/cm$^2$] | Thickness [μm] |
| Example 8 | 1.4 | 28 | 5.6 | 22 | 0.10 | 2 |
| Example 9 | 1.4 | 28 | 5.6 | 22 | 0.30 | 4 |
| Example 10 | 1.4 | 28 | 5.6 | 22 | 0.45 | 6 |
| Comparative Example 9 | 1.4 | 28 | 5.6 | 22 | 0.07 | 1 |
| Comparative Example 10 | 1.4 | 28 | 5.6 | 22 | 0.60 | 8 |
| Comparative Example 11 | 2.5 | 50 | 9.0 | 36 | 0.30 | 8 |
| Comparative Example 12 | 0.7 | 14 | 3.4 | 14 | 0.30 | 1 |

[Initial Performance and Performance Deterioration Rate]

As for Examples 8-10 and Comparative Examples 9-12, initial cell voltages [mV] were measured, and a transition of the voltage decrease after predetermined times activation of the MEAs was calculated by a linear approximation. The respective values were described as initial performance and a performance deterioration rate in Table 4 hereinafter.

Note the initial performance and the performance deterioration rate were calculated as follows.

The initial performance was measured by a JARI standard cell of which electrode area was 25 cm$^2$. The cell temperature was set at 50° C. and a cycle test of starting and stopping was conducted. At the starting, pure hydrogen was used as an anode gas and air was used as a cathode gas. Then, after the surroundings atmosphere of both electrodes was replaced by nitrogen gas at the stopping time, the nitrogen gas was further replaced by air. That operation was counted as one cycle. Humidity conditions of the gases were set in 100% Rh for both cathode and anode gases.

In order to calculate the performance deterioration rate, the cell temperature was set at 70° C., the humidity condition of the anode was set in 65% Rh, the humidity condition of the cathode was set in 75% Rh, and both gas pressures were set to 100 kPa. Then, the cell voltage was measured while the electric power was generated at the current density of 1 A/cm$^2$ per 200 starting and stopping cycles. The above operation was repeated until the number of the starting and stopping cycles became 3000, and the transition of the cell voltage decrease was calculated by a linear approximation.

Note a basis of setting the number of the starting and stopping cycles to 3000 was attributed to the assumption that the cell voltage capacity decrease of around 40 mV was necessary to accurately evaluate the performance deterioration rate. Accordingly, it was expected that the starting and stopping cycles of 3000, in which a cell voltage decrease in 40 mV or more conventionally occurred, allowed the performance deterioration in the long-term use to be accurately determined.

In Table 4, were listed the initial performance [mV] and the performance deterioration rate [mV/1000 times] in Examples 8-10 and Comparative Examples 9-12.

Note the initial performance listed in Table 4 was evaluated as "Good" when the value was 600 mV or more, while evaluated as "Poor" when the value was less than 600 mV. The performance deterioration rate was evaluated as "Good" when the value was 20 mV/1000 times or less, while evaluated as "Poor" when the value was more than 20 mV/1000 times.

TABLE 4

|  | Initial performance | | Performance deterioration rate | |
| --- | --- | --- | --- | --- |
|  | [mV] | Evaluation | [mV/1000 times] | Evaluation |
| Example 8 | 618 | Good | 20 | Good |
| Example 9 | 610 | Good | 18 | Good |
| Example 10 | 600 | Good | 14 | Good |
| Comparative Example 9 | 623 | Good | 41 | Poor |
| Comparative Example 10 | 572 | Poor | 13 | Good |
| Comparative Example 11 | 583 | Poor | 19 | Good |
| Comparative Example 12 | 598 | Poor | 22 | Poor |

As shown in Table 4, the MEAs in Examples 8-10 satisfied the all conditions of the present invention, resulting in the evaluation as "Good" on both the initiate performance and the performance deterioration rate.

In contrast, the MEAs in Comparative Examples 9-12 did not satisfy at least one condition required in the present invention, resulting in the evaluation as "Poor" on at least either of the initiate performance and the performance deterioration rate.

More specifically, in Comparative Example 9, a thickness of the intermediate layer was less than 2 μm, and the content of the platinum black powder (or noble metallic nanoparticles) was less than 0.1 mg/cm$^2$ per unit projected area, resulting in the evaluation on the performance deterioration rate as "Poor".

In comparative Example 10, a thickness of the intermediate layer was more than 6 μm, and the content of the platinum black powder (or noble metallic nanoparticles) was more than 0.5 mg/cm$^2$ per unit projected area, resulting in the evaluation on the initial performance as "Poor".

In comparative Example 11, a thickness of the intermediate layer was more than 6 μm, and the content of the carbon black (or carbon powder) was more than 45 mass % to the content of the platinum black powder (or noble metallic nanoparticles), resulting in the evaluation on the initial performance as "Poor".

In comparative Example 12, a thickness of the intermediate layer was less than 2 μm, and the content of the carbon black (or carbon powder) was less than 15 mass % to the content of the platinum black powder (or noble metallic nanoparticles), resulting in the evaluation on both the initial performance and the performance deterioration rate as "Poor".

Note the present invention is not limited to the above mentioned embodiments, and various modifications and improvements may be included within the scope of achieving the object of the present invention.

For example, an embodiment in which the intermediate layer was arranged at both anode and cathode sides, while another embodiment in which the intermediate layer was arranged at only the cathode side. However, the advantageous effect of the present invention may be achieved at a little lower degree to the previously described embodiment, even though the intermediate layer was arranged at only the anode side.

DESCRIPTION OF REFERENCE NUMERALS

1 Membrane electrode assembly for a polymer electrolyte fuel cell
2 Proton conductive membrane
3 Electrode catalyst layer
4 Gas diffusion layer
5 Intermediate layer
51 Noble metallic nanoparticles
52 Electrode electrolyte
10 Polymer electrolyte fuel cell

The invention claimed is:

1. A membrane electrode assembly for a polymer electrolyte fuel cell comprising:
a proton conductive membrane for conducting protons;
electrode catalyst layers arranged on both sides of the proton conductive membrane, each having catalyst particles and an electrode electrolyte;
gas diffusion layers arranged on the electrode catalyst layers, each including a porous basic material; and
at least one intermediate layer having a thickness of 2-6 μm arranged between at least one of the electrode catalyst layers and corresponding one of the gas diffusion layers, containing noble metallic nanoparticles which are not supported by a carrier, an electrode electrolyte, and carbon powder;
wherein:
said carbon powder of said intermediate layer comprises fibrous carbon;
a content of the noble metallic nanoparticles is in the range of 0.1 to 0.5 $mg/cm^2$ per unit projected area; and
a content of the electrode electrolyte in the at least one intermediate layer is in the range of 20 to 25 mass % to a content of the noble metallic nanoparticles.

2. The membrane electrode assembly for a polymer electrolyte fuel cell as described in claim 1, characterized in that at least one of the electrode catalyst layers further includes fibrous carbon.

3. The membrane electrode assembly for a polymer electrolyte fuel cell as described in claim 1, characterized in that the proton conductive membrane is a sulfonated polyarylene polymer.

4. The membrane electrode assembly for a polymer electrolyte fuel cell as described in claim 1, characterized in that an ion exchange capacity IEC of the proton conductive membrane is in the range from 1.9 to 2.4 meq/g.

5. The membrane electrode assembly for a polymer electrolyte fuel cell as described in claim 1, characterized in that a content of the carbon powder in the at least one intermediate layer is in the range from 15 to 45 mass % to the content of the noble metallic nanoparticles.

6. The membrane electrode assembly for a polymer electrolyte fuel cell as described in claim 1, characterized in that a mean particle diameter of the noble metallic nanoparticles is in the range from 4 to 7 nm.

7. The membrane electrode assembly for a polymer electrolyte fuel cell as described in claim 1, wherein the noble metallic nanoparticles are formed of an alloy of a noble metal.

8. The membrane electrode assembly for a polymer electrolyte fuel cell as described in claim 1, wherein the noble metallic nanoparticles are formed of an alloy selected from the group consisting of Pt—Co, Pt—Fe, Pt—Zn, Pt—Cu, Pt—Ni, Pt—Ru, Pt—V, Pt—Pd, Pt—Ir, Pt—Lu, and Au—Pd, and mixtures thereof.

9. The membrane electrode assembly for a polymer electrolyte fuel cell as described in claim 1, wherein the noble metallic nanoparticles in the at least one intermediate layer are different from the catalyst particles in the catalyst layers.

10. The membrane electrode assembly for a polymer electrolyte fuel cell as described in claim 1, wherein, the membrane electrode assembly is configured to be arranged vertically such that reaction gasses will flow from an upper end to a lower end in the membrane electrode assembly.

11. The membrane electrode assembly for a polymer electrolyte fuel cell as described in claim 9, wherein the catalyst particles in the catalyst layers comprise a noble metal, carbon supporting a noble metal, or an oxide supporting a noble metal.

* * * * *